US010216968B2

(12) United States Patent
Kuwaki et al.

(10) Patent No.: US 10,216,968 B2
(45) Date of Patent: Feb. 26, 2019

(54) CARD READER

(71) Applicant: NIDEC SANKYO CORPORATION, Suwa-gun, Nagano (JP)

(72) Inventors: Hirofumi Kuwaki, Nagano (JP); Junro Takeuchi, Nagano (JP); Masaya Fujimoto, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/534,306

(22) PCT Filed: Dec. 1, 2015

(86) PCT No.: PCT/JP2015/083703
§ 371 (c)(1),
(2) Date: Oct. 19, 2017

(87) PCT Pub. No.: WO2016/093107
PCT Pub. Date: Jun. 16, 2016

(65) Prior Publication Data
US 2018/0032764 A1    Feb. 1, 2018

(30) Foreign Application Priority Data
Dec. 8, 2014 (JP) ................... 2014-247683

(51) Int. Cl.
*G06K 7/08* (2006.01)
*G06K 7/00* (2006.01)
*G06F 21/86* (2013.01)

(52) U.S. Cl.
CPC ............ *G06K 7/087* (2013.01); *G06F 21/86* (2013.01); *G06K 7/00* (2013.01); *G06K 7/0056* (2013.01); *G06K 7/0091* (2013.01)

(58) Field of Classification Search
CPC ......... G06K 7/084; G06K 7/086; G06K 7/089
USPC ................................. 235/449, 453
See application file for complete search history.

(56) References Cited

U.S. PATENT DOCUMENTS

| 2008/0265032 A1* | 10/2008 | Horiguchi | G06K 7/083 |
| | | | 235/449 |
| 2009/0094700 A1* | 4/2009 | Goto | G06F 21/86 |
| | | | 726/26 |

FOREIGN PATENT DOCUMENTS

| JP | 2000150685 A | 5/2000 |
| JP | 2004086325 A | 3/2004 |
| JP | 2008293628 A | 12/2008 |
| JP | 2009037364 A | 2/2009 |
| JP | 2009093401 A | 4/2009 |
| JP | 2013186602 A | 9/2013 |

OTHER PUBLICATIONS

International Search Report corresponding to Application No. PCT/JP2015/083703; dated Jan. 12, 2016.

* cited by examiner

*Primary Examiner* — Daniel St Cyr
(74) *Attorney, Agent, or Firm* — Cantor Colburn LLP

(57) ABSTRACT

A card reader for use with a card may include a data signal circuit pattern structured to transmit at least one of a data signal read from a card and a data signal to be recorded to the card; and a breakage detection circuit pattern structured to detect at least one of its own disconnection and its own short-circuit. The data signal circuit pattern is disposed within a protected region that is a region surrounded from all directions by the breakage detection circuit pattern.

18 Claims, 10 Drawing Sheets

ID READER

CROSS REFERENCE TO RELATED APPLICATIONS

This is the U.S. national stage of application No. PCT/JP2015/083703, filed on Dec. 1, 2015. Priority under 35 U.S.C. § 119(a) and 35 U.S.C. § 365(b) is claimed from Japanese Application No. 2014-247683, filed on Dec. 8, 2014, the disclosure of which is incorporated herein by reference.

FIELD OF THE INVENTION

At least an embodiment of the present invention relates to a card reader structured to perform reading of data recorded on a card and/or recording data to a card.

BACKGROUND

Conventionally, a card reader has been known which is provided with a security function structured to detect illegal detachment of the card reader from its host apparatus to prevent illegal acquisition of data (see, for example, Patent Literatures 1 and 2). A card reader described in Patent Literature 1 includes a sheet switch disposed on a front face of the card reader. In this card reader, when the card reader is attached to a host apparatus, a protruded part formed on a rear face side of a front panel of the host apparatus presses the sheet switch and, when the card reader is detached from the host apparatus, the pressed state of the sheet switch is released. Therefore, in this card reader, it can be detected that the card reader has been illegally detached from the host apparatus based on a state of the sheet switch. Further, in this card reader, when it is detected that the card reader has been illegally detached from the host apparatus, a predetermined processing for preventing illegal acquisition of data is executed and illegal acquisition of data from the card reader can be prevented.

A card reader described in Patent Literature 2 includes a tamper switch. The tamper switch includes a tamper member which is formed in a columnar shape and a tamper conduction member which is disposed at a position capable of being pressed by the tamper member. In this card reader, when the card reader is attached to a host apparatus, the tamper member is moved to a side of the tamper conduction member and presses the tamper conduction member and thereby the tamper conduction member becomes an electrically conductive state. Further, when the card reader is detached from the host apparatus, the tamper member is moved in a direction separated from the tamper conduction member and the tamper conduction member becomes a non-conductive state. Therefore, in this card reader, it can be detected that the card reader has been illegally detached from the host apparatus based on a state of the tamper switch. Further, in this card reader, when it is detected that the card reader has been illegally detached from the host apparatus, a predetermined processing for preventing illegal acquisition of data is executed and illegal acquisition of data from the card reader can be prevented.

CITATION LIST

[PTL 1] Japanese Patent Laid-Open No. 2009-37364
[PTL 2] Japanese Patent Laid-Open No. 2013-186602
In the card readers described in Patent Literatures 1 and 2, when the card reader is detached from a host apparatus by a criminal who is trying to illegally acquire data, a predetermined processing is executed based on a detected result of the sheet switch or the tamper switch and thus illegal acquisition of data from the card reader can be prevented. However, in the card readers described in Patent Literatures 1 and 2, if a criminal is trying to illegally acquire data without detaching the card reader from a host apparatus, illegal acquisition of data from the card reader cannot be prevented.

Further, in a case that the sheet switch which is used in the card reader described in Patent Literature 1 is used, a moving amount of a portion of the sheet switch which is pressed by a protruded part of a front panel is a little. Therefore, in the card reader described in Patent Literature 1, if the card reader is not attached to a host apparatus with a high degree of accuracy, when the card reader is attached to the host apparatus, a state may occur that the sheet switch is not pressed and thus it may be erroneously detected whether the card reader is attached to the host apparatus or not.

On the other hand, the tamper switch used in the card reader described in Patent Literature 2 is structured of a tamper member formed in a columnar shape and a tamper conduction member and thus, a moving amount of the tamper member can be increased between a position of the tamper member when the card reader is attached to a host apparatus and a position of the tamper member when the card reader is detached from the host apparatus. Therefore, in the card reader described in Patent Literature 2, even in a case that the card reader is not attached to the host apparatus with a high degree of accuracy, when the card reader is attached to the host apparatus, the tamper conduction member can be set in an electrically conductive state. As a result, it can be detected with a high degree of accuracy that the card reader has been attached to the host apparatus.

However, in the tamper switch which is used in the card reader described in Patent Literature 2, the tamper member is formed in a columnar shape and thus, some trick may be easily applied to the tamper member so that the tamper member is not moved when the card reader is detached from the host apparatus. Further, when some trick is applied to the tamper member so that the tamper member is not moved when the card reader is detached from the host apparatus, it is difficult to prevent illegal acquisition of data from the card reader.

SUMMARY

In view of the problem described above, at least an embodiment of the present invention provides a card reader capable of preventing illegal acquisition of data from the card reader even when a criminal is trying to illegally acquire data without detaching the card reader from a host apparatus.

In view of the problem described above, at least an embodiment of the present invention provides a card reader which is capable of detecting with a high degree of accuracy that the card reader is attached to a host apparatus and preventing illegal acquisition of data from the card reader even when the card reader is not attached to the host apparatus with a high degree of accuracy.

To attain the above, at least an embodiment of the present invention provides a card reader including a data signal circuit pattern formed to transmit at least one of a data signal read from a card and a data signal to be recorded to the card, and a breakage detection circuit pattern formed to detect at least one of its own disconnection and its own short-circuit.

The data signal circuit pattern is disposed within a protected region that is a region surrounded from all directions by the breakage detection circuit pattern.

In the card reader in at least an embodiment of the present invention, a data signal circuit pattern is disposed within a protected region that is a region surrounded from all directions by a breakage detection circuit pattern. Therefore, according to at least an embodiment of the present invention, in order to illegally acquire data from the card reader in a state that the card reader has been attached to a host apparatus, when a criminal performs some trick in the card reader, the breakage detection circuit pattern is disconnected or short-circuited and thus it is detected that some trick is being performed on the card reader. Accordingly, in at least an embodiment of the present invention, a predetermined processing can be executed, for example, data stored in the card reader are erased on the basis of a detected result of the breakage detection circuit pattern and thereby, even if a criminal tries to illegally acquire data from the card reader without detaching the card reader from the host apparatus, data are prevented from being illegally acquired from the card reader.

In at least an embodiment of the present invention, the card reader includes, for example, a first printed circuit board in a plate shape or a film shape which is formed with the breakage detection circuit pattern and is disposed on a front face side of the card reader, a second printed circuit board in a plate shape or a film shape which is formed with the breakage detection circuit pattern and is disposed on a rear face side of the card reader, a third printed circuit board in a plate shape or a film shape which is formed with the breakage detection circuit pattern and is disposed on one side in a thickness direction of the card inserted into the card reader, a fourth printed circuit board in a plate shape or a film shape which is formed with the breakage detection circuit pattern and is disposed on the other side in the thickness direction of the card, a fifth printed circuit board in a plate shape or a film shape which is formed with the breakage detection circuit pattern and is disposed on one side in a width direction of the card which is perpendicular to a front and rear direction of the card reader and the thickness direction of the card, and a sixth printed circuit board in a plate shape or a film shape which is formed with the breakage detection circuit pattern and is disposed on the other side in the width direction of the card. The protected region is structured of a region which is surrounded by the breakage detection circuit pattern formed in the first printed circuit board, the breakage detection circuit pattern formed in the second printed circuit board, the breakage detection circuit pattern formed in the third printed circuit board, the breakage detection circuit pattern formed in the fourth printed circuit board, the breakage detection circuit pattern formed in the fifth printed circuit board, and the breakage detection circuit pattern formed in the sixth printed circuit board.

In at least an embodiment of the present invention, the first printed circuit board and the third printed circuit board are rigid circuit boards formed in a plate shape, the second printed circuit board, the fourth printed circuit board, the fifth printed circuit board and the sixth printed circuit board are flexible circuit boards which are formed in a film shape, and the second printed circuit board, the fourth printed circuit board, the fifth printed circuit board and the sixth printed circuit board are integrally formed with each other and are stuck on an inner side face of a case body which structures a part of a housing of the card reader.

According to this structure, the second printed circuit board, the fourth printed circuit board, the fifth printed circuit board and the sixth printed circuit board are integrally formed with each other and thus the second printed circuit board, the fourth printed circuit board, the fifth printed circuit board and the sixth printed circuit board can be easily handled when the card reader is to be assembled. Further, according to this structure, the second printed circuit board, the fourth printed circuit board, the fifth printed circuit board and the sixth printed circuit board are stuck on an inner side face of a case body. Therefore, even when the second printed circuit board, the fourth printed circuit board, the fifth printed circuit board and the sixth printed circuit board are flexible circuit boards, the data signal circuit pattern can be surely surrounded by the breakage detection circuit patterns from the rear side of the card reader, the other side in a thickness direction of a card, and both sides in a width direction of the card.

In at least an embodiment of the present invention, the card reader includes two pieces of the first printed circuit board which are disposed in a separated state with a predetermined distance therebetween in the thickness direction of the card, and a card is passed between the two pieces of the first printed circuit board. According to this structure, in comparison with a case that a passage opening where a card is passed is formed in one piece of a printed circuit board, respective shapes of the two pieces of the first printed circuit board can be simplified.

In at least an embodiment of the present invention, the first printed circuit board is attached with an attaching detection mechanism structured to detect that the card reader has been attached to a host apparatus, and the attaching detection mechanism includes a switch member formed in a bar shape and a pressed member which is mounted on the first printed circuit board and is capable of being switched between a pressed state pressed by the switch member with a predetermined force and a non-pressed state that the pressed state is released and, when the card reader is attached to the host apparatus, the switch member is moved to a side of the pressed member and the pressed member is switched to the pressed state from the non-pressed state and, when the card reader is detached from the host apparatus, the switch member is moved in a direction separated from the pressed member and the pressed member is switched to the non-pressed state from the pressed state.

According to this structure, it can be detected that the card reader has been illegally detached from the host apparatus based on a detected result of the attaching detection mechanism. Further, according to this structure, in comparison with a case that another printed circuit board to which the attaching detection mechanism is attached is provided in addition to the first printed circuit board, the structure of the card reader can be simplified. In addition, according to this structure, the attaching detection mechanism includes a switch member formed in a bar shape and a pressed member which is capable of being switched between a pressed state and a non-pressed state. Therefore, a moving amount of the switch member between a position of the switch member when the card reader has been attached to the host apparatus and a position of the switch member when the card reader is detached from the host apparatus can be increased. Accordingly, even in a case that the card reader is not attached to the host apparatus with a high degree of accuracy, when the card reader is attached to the host apparatus, the pressed member can be switched to a pressed state and, as a result, it can be detected with a high degree of accuracy that the card reader has been attached to the host apparatus.

In at least an embodiment of the present invention, the switch member is surrounded by a printed circuit board in a plate shape or a film shape which is formed with a breakage detection circuit pattern formed to detect at least one of its own disconnection and its own short-circuit. According to this structure, when a criminal is trying to apply some trick to the switch member so that the switch member is not moved in a case that the card reader is detached from the host apparatus, the breakage detection circuit pattern is disconnected or short-circuited and thus it is detected that some trick is to be performed on the switch member. Therefore, illegal acquisition of data from the card reader can be prevented by executing a predetermined processing on the basis of a detected result of the breakage detection circuit pattern, for example, data stored in the card reader are erased.

Further, in order to attain the above, at least an embodiment of the present invention provides a card reader which is attached to and used in a host apparatus, the card reader including an attaching detection mechanism structured to detect that the card reader has been attached to the host apparatus. The attaching detection mechanism includes a switch member which is formed in a bar shape, and a pressed member which is capable of being switched between a pressed state pressed by the switch member with a predetermined force and a non-pressed state that the pressed state is released. When the card reader is attached to the host apparatus, the switch member is moved to a side of the pressed member and the pressed member is switched to the pressed state from the non-pressed state and, when the card reader is detached from the host apparatus, the switch member is moved in a direction separated from the pressed member and the pressed member is switched to the non-pressed state from the pressed state. The switch member is surrounded by a printed circuit board in a plate shape or a film shape which is formed with a breakage detection circuit pattern formed to detect at least one of its own disconnection and its own short-circuit.

In the card reader in at least an embodiment of the present invention, the attaching detection mechanism includes a switch member formed in a bar shape and a pressed member which is capable of being switched between a pressed state and a non-pressed state. Therefore, according to at least an embodiment of the present invention, a moving amount of the switch member between a position of the switch member when the card reader has been attached to a host apparatus and a position of the switch member when the card reader is detached from the host apparatus can be increased. Accordingly, even in a case that the card reader is not attached to the host apparatus with a high degree of accuracy, when the card reader is attached to the host apparatus, the pressed member can be switched to a pressed state and, as a result, it can be detected with a high degree of accuracy that the card reader has been attached to the host apparatus.

Further, in at least an embodiment of the present invention, the switch member is surrounded by a printed circuit board in a plate shape or a film shape which is formed with a breakage detection circuit pattern formed to detect at least one of its own disconnection and its own short-circuit. Therefore, according to at least an embodiment of the present invention, when a criminal is trying to apply some trick to the switch member so that the switch member is not moved in a case that the card reader is detached from the host apparatus, the breakage detection circuit pattern is disconnected or short-circuited and thus it is detected that some trick is to be performed on the switch member. Accordingly, in at least an embodiment of the present invention, illegal acquisition of data from the card reader can be prevented by executing a predetermined processing, for example, data stored in the card reader are erased, on the basis of a detected result of the breakage detection circuit pattern.

In at least an embodiment of the present invention, the card reader includes, for example, an abutting member having an abutting face which is to be abutted with a rear face of a front panel structuring a front face of the host apparatus. The abutting member is formed with an insertion hole so as to be penetrated through the abutting member, a tip end side portion of the switch member is inserted into the insertion hole and, when the card reader is not attached to the host apparatus, the tip end side portion of the switch member is protruded to a front face side of the card reader with respect to the abutting face, and a rear side portion of the switch member with respect to the abutting member is surrounded by the printed circuit board.

In at least an embodiment of the present invention, the switch member is disposed on one side in a thickness direction of a card with respect to a card passage where the card inserted into the card reader is passed and, when a direction perpendicular to a front and rear direction of the card reader and a thickness direction of the card is referred to as a width direction of the card, the printed circuit board surrounds the switch member from four directions, in other words, from both sides in the width direction of the card, from one side in the thickness direction of the card, and from a rear face side of the card reader. In a case that the switch member is disposed on one side in a thickness direction of a card with respect to the card passage, it is difficult to apply some trick to the switch member from the other side in the thickness direction of the card. Therefore, according to the above-mentioned structure, a region where the switch member is surrounded by the printed circuit board for preventing some trick from being performed on the switch member can be limited to a necessary minimum region. Accordingly, the size of the card reader can be reduced.

In at least an embodiment of the present invention, the printed circuit board also surrounds the pressed member. According to this structure, also in a case that a criminal is trying to apply some trick to the pressed member, the breakage detection circuit pattern is disconnected or short-circuited. Therefore, illegal acquisition of data from the card reader can be effectively prevented by executing a predetermined processing, for example, data stored in the card reader are erased, on the basis of a detected result of the breakage detection circuit pattern.

In at least an embodiment of the present invention, the card reader includes a first printed circuit board in a plate shape or a film shape which is formed with a breakage detection circuit pattern formed to detect at least one of its own disconnection and its own short-circuit, the first printed circuit board being disposed on a front face side of the card reader, and the attaching detection mechanism is attached to the first printed circuit board. According to this structure, when a criminal performs some trick on the card reader from a front face side in order to illegally acquire data from the card reader in a state that the card reader has been attached to a host apparatus, the breakage detection circuit pattern is disconnected or short-circuited and thus it can be detected that some trick is performing on the card reader. Further, according to this structure, in a case that, in addition to the first printed circuit board, another printed circuit board to which the attaching detection mechanism is attached is separately provided, the structure of the card reader can be simplified.

In at least an embodiment of the present invention, the printed circuit board is a flexible circuit board formed in a film shape. According to this structure, the printed circuit board can be flexibly disposed depending on a surrounding situation of the switch member. Therefore, an arrangement of the printed circuit board surrounding the switch member is relatively easy.

As described above, in at least an embodiment of the present invention, even if a criminal tries to illegally acquire data from the card reader without detaching the card reader from the host apparatus, data can be prevented from being illegally acquired from the card reader.

Further, in at least an embodiment of the present invention, even in a case that the card reader is not attached to a host apparatus with a high degree of accuracy, while it can be detected with a high degree of accuracy that the card reader has been attached to the host apparatus, data can be prevented from being illegally acquired from the card reader.

BRIEF DESCRIPTION OF DRAWINGS

Embodiments will now be described, by way of example only, with reference to the accompanying drawings which are meant to be exemplary, not limiting, and wherein like elements are numbered alike in several Figures, in which.

DESCRIPTION OF EMBODIMENTS

An embodiment of the present invention will be describe below with reference to the accompanying drawings.
(Entire Structure of Card Reader)

Figure 1:
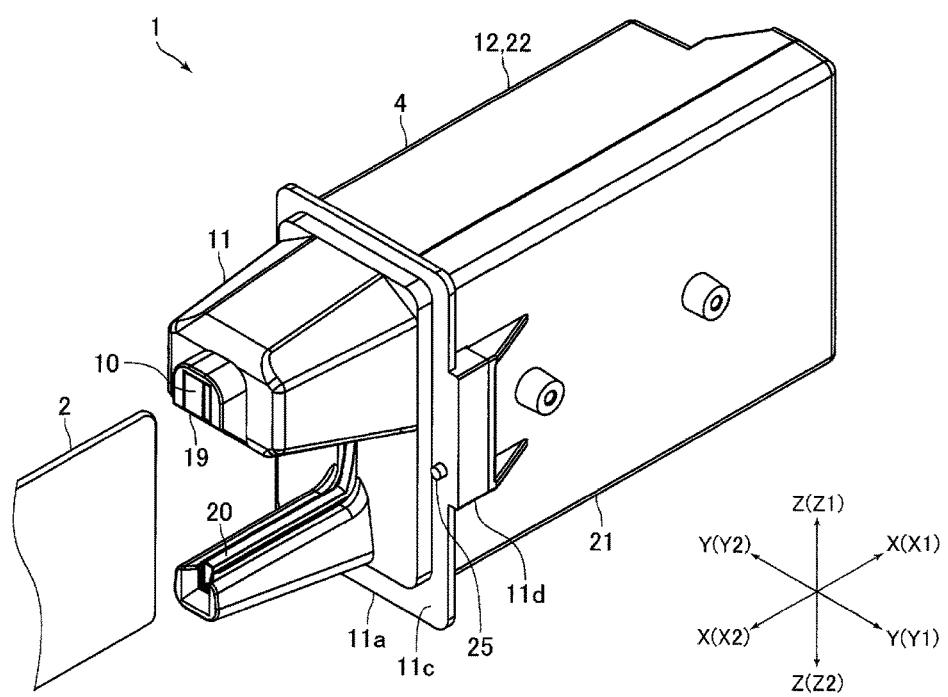
FIG. 1 is a perspective view showing a card reader in accordance with an embodiment of the present invention.
Figure 2:
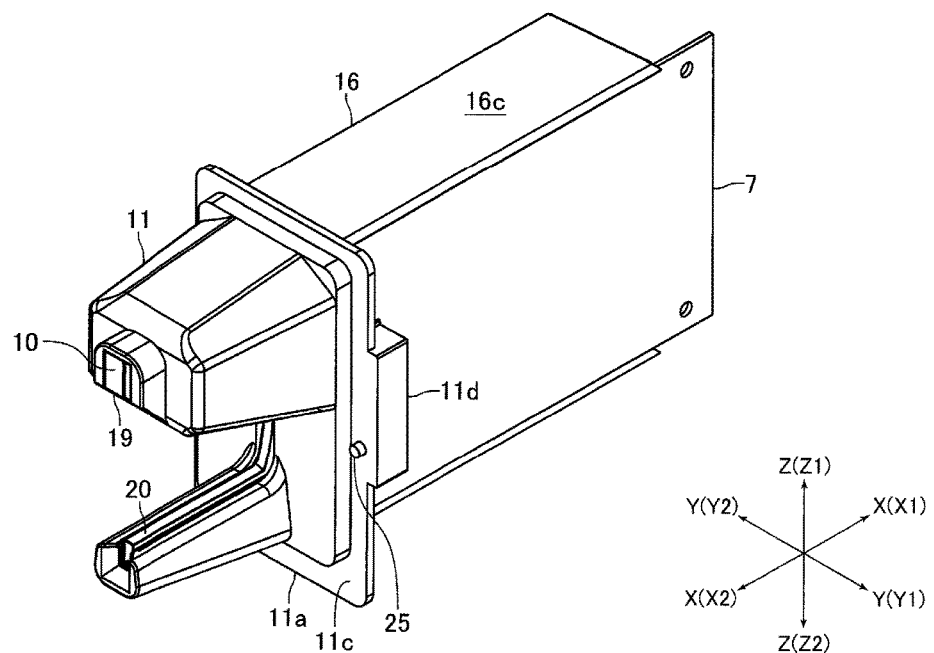
FIG. 2 is a perspective view showing a state that a case body is detached from the card reader shown in FIG. 1.
Figure 3:
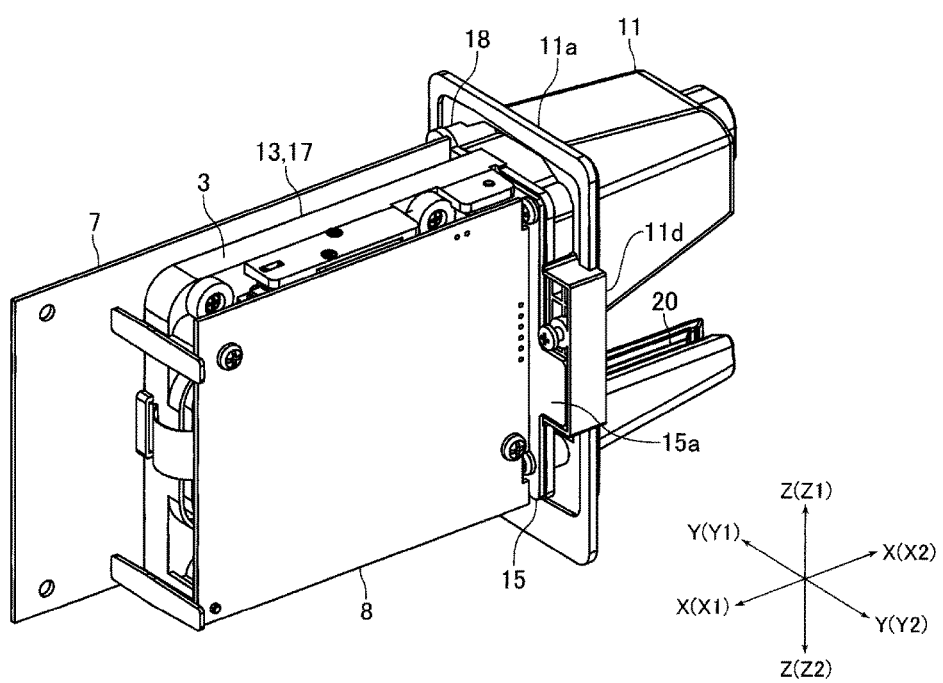
FIG. 3 is a perspective view showing a state that a printed circuit board is detached from the card reader shown in FIG. 2 and is viewed from another direction.
Figure 4:
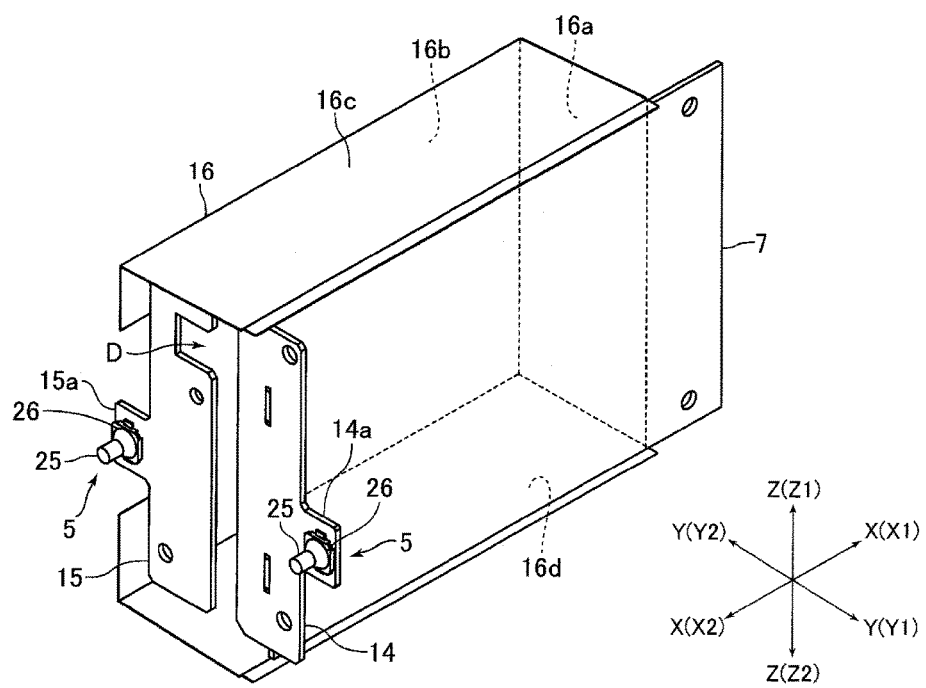
FIG. 4 is a perspective view showing printed circuit boards and attaching detection mechanisms which are detached from the card reader shown in FIG. 1.

FIG. 1 is a perspective view showing a card reader 1 in accordance with an embodiment of the present invention. FIG. 2 is a perspective view showing a state that a case body 12 is detached from the card reader 1 shown in FIG. 1. FIG. 3 is a perspective view showing a state that a printed circuit board 16 is detached from the card reader 1 shown in FIG. 2 and is viewed from another direction. FIG. 4 is a perspective view showing printed circuit boards 7, 14 through 16 and attaching detection mechanisms 5 which are detached from the card reader 1 shown in FIG. 1.

A card reader 1 in this embodiment is a device in which a card 2 is manually operated by a user to perform reading of data recorded in the card 2 and recording data to the card 2. Specifically, the card reader 1 is a so-called dip-type card reader in which insertion of a card 2 to the card reader 1 and pulling-out of the card 2 from the card reader 1 are manually operated to perform reading and recording of data. The card reader 1 is, for example, attached to and used in a host apparatus such as a refueling device of an unmanned or a self-service system gas station. Further, the card reader 1 includes a card reader main body 3, a housing 4 in which the card reader main body 3 is accommodated, and an attaching detection mechanism 5 structured to detect that the card reader 1 has been attached to a host apparatus.

The card reader main body 3 includes a magnetic head (not shown) structured to perform reading of magnetic data recorded on a card 2 and recording of magnetic data to the card 2, and an IC contact block (not shown) having a plurality of IC contact points structured to perform data communication with an IC chip incorporated in the card 2. The card reader main body 3 is attached with a printed circuit board 7 with which lead wires (not shown) extended from the magnetic head are connected and a printed circuit board 8 with which a cable extended from the IC contact block is connected.

The housing 4 is structured of a front cover 11 formed with an insertion port 10 for a card 2 and a case body 12. Further, the card reader main body 3 is provided with a main body frame 13 which is fixed to the front cover 11 and is accommodated in the case body 12. The main body frame 13 is attached with two printed circuit boards 14 and 15. Further, a printed circuit board 16 is adhesively attached to an inner side face of a second case body 22 described below which structures the case body 12.

In this embodiment, a card 2 which is manually operated is moved in the "X" direction shown in FIG. 1 and the like. Specifically, a card 2 is inserted to the "X1" direction and the card 2 is pulled out to the "X2" direction. In other words, the "X1" direction side is a rear face side of the card reader 1 and the "X2" direction side is a front face side of the card reader 1. Further, the "Y" direction in FIG. 1 and the like perpendicular to the "X" direction is a thickness direction of a card 2 inserted into the card reader 1, and the "Z" direction in FIG. 1 and the like perpendicular to the "X" direction and the "Y" direction is a width direction (short width direction) of a card 2 inserted into the card reader 1. In the following descriptions, the "X" direction is referred to as a front and rear direction, the "Y" direction is referred to as a right and left direction, and the "Z" direction is referred to as an upper and lower direction. Further, the "X1" direction side is referred to as a "rear (back)" side, the "X2" direction side is referred to as a "front" side, the "Y1" direction side is a "right" side, the "Y2" direction side is a "left" side, the "Z1" direction side is an "upper" side, and the "Z2" direction side is a "lower" side.

A card 2 is, for example, a rectangular card made of vinyl chloride whose thickness is about 0.7-0.8 mm. One of faces of the card 2 is formed with a magnetic stripe in which magnetic data are recorded. Further, an IC chip is incorporated into the card 2. The other face of the card 2 is formed with an external connection terminal of the IC chip. In accordance with an embodiment of the present invention, a card 2 may be a PET (polyethylene terephthalate) card whose thickness is about 0.18-0.36 mm, or may be a paper card having a predetermined thickness.

The main body frame 13 includes a box-shaped card accommodation part 17 in which a rear end side of a card 2 inserted into the insertion port 10 is accommodated, a partition part 18 which is enlarged in a flange shape from a front end of the card accommodation part 17, a head arrangement part 19 which is formed so as to protrude from the partition part 18 to a front side and in which the magnetic head is disposed, and a card guide part 20 which is formed so as to protrude from the partition part 18 to a front side and is structured to guide the card 2 inserted into the insertion port 10.

The IC contact block is attached in the card accommodation part 17. A printed circuit board 7 formed in a plate shape is fixed to a right side face of the card accommodation part 17, and a printed circuit board 8 formed in a plate shape is fixed to a left side face of the card accommodation part 17. A sealing member (not shown) is disposed on a front face side of the partition part 18. The sealing member is formed of rubber or the like and is formed in a ring shape. The head arrangement part 19 and the card guide part 20 are formed in a separated state from each other with a predetermined space therebetween in the upper and lower direction.

Figure 7:
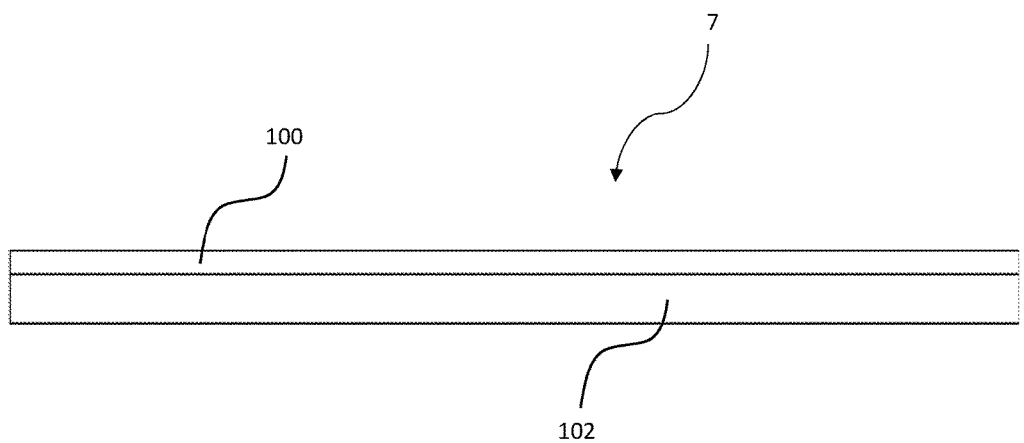
FIG. 7 is a side view of a printed circuit board according to at least an embodiment.
Figure 8:
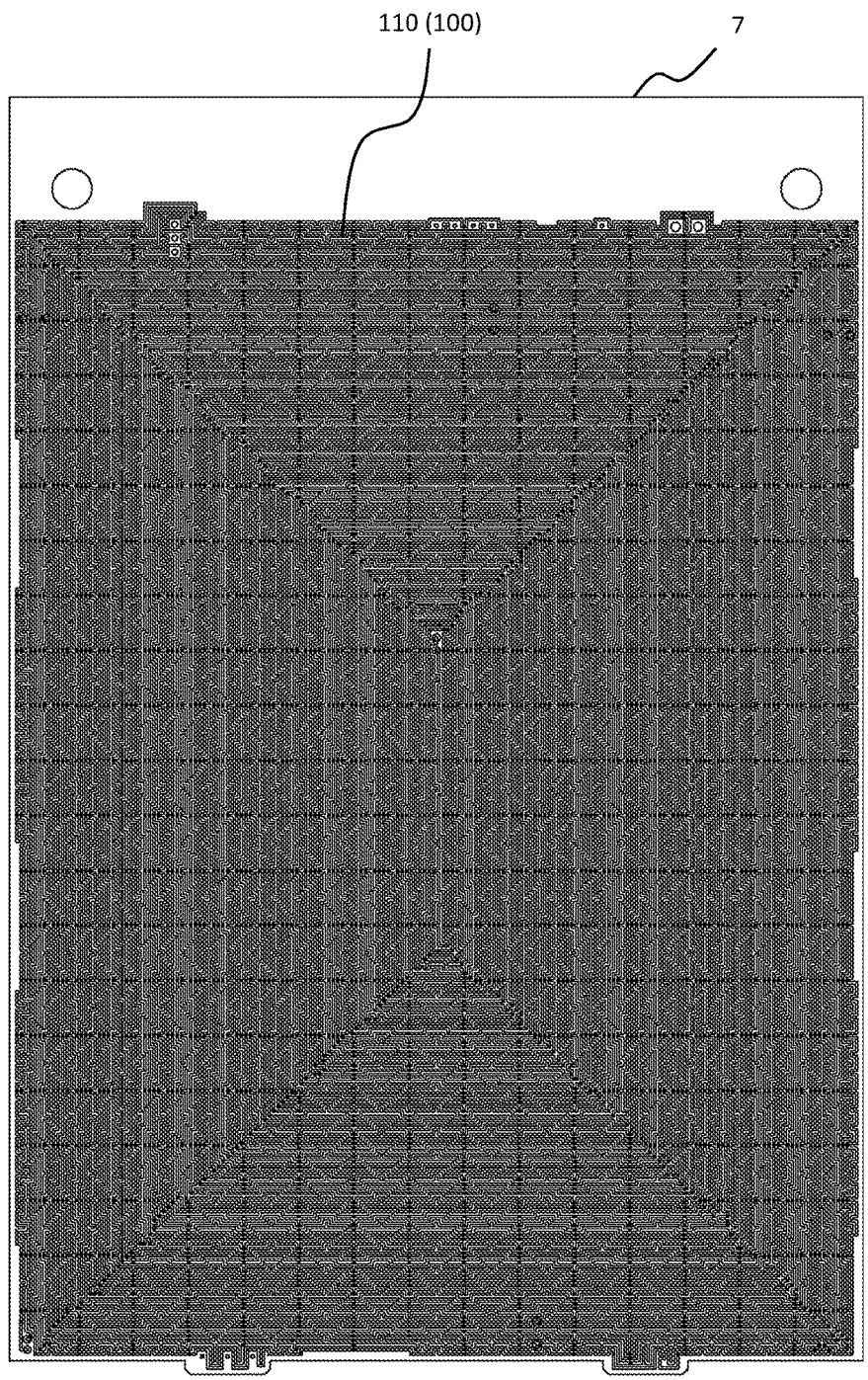
FIG. 8 is a plan view of a printed circuit board and a breakage detection circuit pattern according to at least an embodiment.
Figure 9:
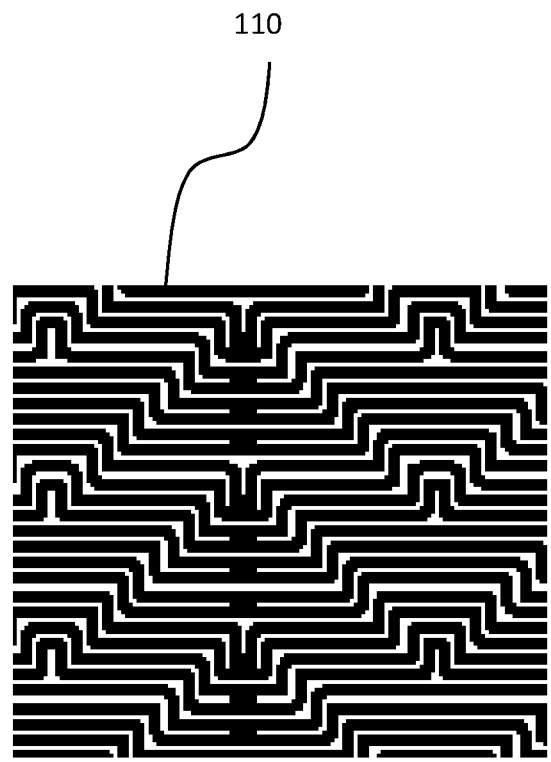
FIG. 9 is an enlarged view of a portion of a breakage detection circuit pattern according to at least an embodiment.
Figure 10:
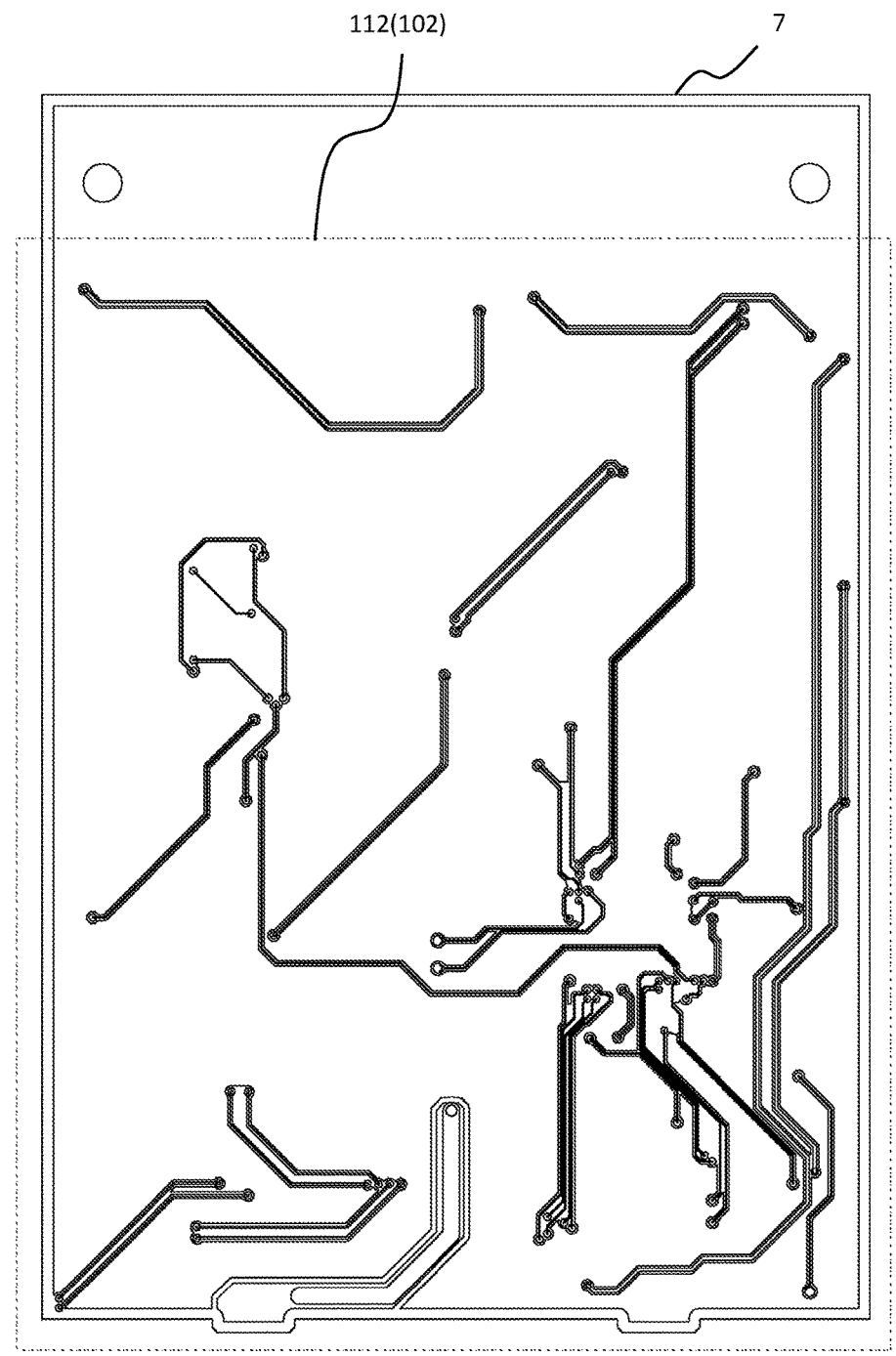
FIG. 10 is a plan view of a printed circuit board and a data signal circuit pattern according to at least an embodiment.

FIGS. 7-10 show at least an embodiment of the printed circuit board 7. For example, FIG. 7 shows that printed circuit board 7 includes a breakage detection circuit pattern layer 100 and a data signal circuit pattern layer 102. FIG. 8 shows that the breakage detection circuit pattern layer 100 includes a breakage detection circuit patter 110. FIG. 9 shows an enlarged view of a portion of the breakage detection circuit pattern 110. FIG. 10 shows that data signal circuit pattern layer 102 includes data signal circuit pattern 112.

The front cover 11 is formed of resin material. The front cover 11 covers a front side portion of the main body frame 13 with respect to the partition part 18. A flange part 11a formed in a flange shape is formed on a rear face side of the front cover 11. The flange part 11a is formed so as to be enlarged in the upper and lower direction and the right and left direction and is formed in a substantially rectangular frame shape which is long in the upper and lower direction. The case body 12 is formed in a box shape having a substantially rectangular parallelepiped shape whose front end is opened. The case body 12 is fixed to the front cover 11 in a state that its front end is abutted with a rear face of the flange part 11a. A rear side portion of the main body frame 13 with respect to the partition part 18 is disposed in an inside of the case body 12, and the rear side portion of the main body frame 13 with respect to the partition part 18 is covered by the case body 12.

The case body 12 is structured of a first case body 21 and a second case body 22 which are divided into two pieces in the right and left direction. The first case body 21 structures a right side portion of the case body 12 and the second case body 22 structures a left side portion of the case body 12. Further, the first case body 21 is structured of a right side face part structuring a right side face of the case body 12, upper and lower side face parts structuring portions of upper and lower side faces of the case body 12, and a rear side face part structuring a portion of a rear face of the case body 12. The second case body 22 is structured of a left side face part structuring a left side face of the case body 12, upper and lower side face parts structuring most portions of upper and lower side faces of the case body 12, and a rear side face part structuring a most portion of a rear face of the case body 12.

A width of the first case body 21 in the right and left direction is set to be narrower than a width of the second case body 22 in the right and left direction. Further, a right end face of the second case body 22 is disposed on the right side with respect to the printed circuit board 7. Alternatively, a right end face of the second case body 22 is disposed at the same position as the printed circuit board 7 in the right and left direction. In other words, the first case body 21 covers a part of the card reader main body 3 (specifically, the rear side portion of the card reader main body 3 with respect to the partition part 18) and the printed circuit board 7 from a right side. Further, the second case body 22 covers a part of the card reader main body 3 (specifically, the rear side portion of the card reader main body 3 with respect to the partition part 18) and the printed circuit board 8 from a left side, a rear side and both upper and lower sides. Further, the second case body 22 covers the printed circuit board 7 from a rear side and both upper and lower sides.

The printed circuit board 7 is a rigid circuit board which is formed in a substantially rectangular flat plate shape. The printed circuit board 7 is fixed to the card reader main body 3 so that its thickness direction and the right and left direction are coincided with each other. Further, the printed circuit board 7 includes a data signal circuit pattern layer which is formed with a data signal circuit pattern formed to transmit a magnetic data signal read from a card 2 by the magnetic head and a magnetic data signal to be recorded in the card 2 by the magnetic head, and a breakage detection circuit pattern layer which is formed with a breakage detection circuit pattern formed to detect its own disconnection and its short-circuit. In the printed circuit board 7, the data signal circuit pattern layer is disposed on a left side with respect to the breakage detection circuit pattern layer.

The printed circuit board 8 is a rigid circuit board which is formed in a substantially rectangular flat plate shape. The printed circuit board 8 is fixed to the card reader main body 3 so that its thickness direction and the right and left direction are coincided with each other. A size of the printed circuit board 8 is set to be smaller than a size of the printed circuit board 7 and, when viewed in the right and left direction, an outer peripheral edge of the printed circuit board 8 is located on an inner side with respect to an outer peripheral edge of the printed circuit board 7. The printed circuit board 8 includes a data signal circuit pattern layer which is formed with a data signal circuit pattern formed to transmit a data signal read from an IC chip of a card 2 by IC contact points and a data signal to be recorded in the IC chip of the card 2 by the IC contact points. In this embodiment, the printed circuit board 8 includes no breakage detection circuit pattern layer which is formed with a breakage detection circuit pattern formed to detect its own disconnection and its short-circuit.

Printed circuit boards 14 and 15 are rigid circuit boards which are formed in a substantially rectangular flat plate shape and are long and thin in the upper and lower direction. The printed circuit boards 14 and 15 are fixed to a rear face of the partition part 18 so that their thickness directions and the front and rear direction are coincided with each other. Further, the printed circuit boards 14 and 15 are disposed on a front side with respect to the printed circuit boards 7 and 8. The printed circuit board 14 and the printed circuit board 15 are disposed with a predetermined space therebetween in the right and left direction and a card 2 is passed between the printed circuit board 14 and the printed circuit board 15 in the right and left direction. In this embodiment, the printed circuit board 14 is disposed on the right side and the printed circuit board 15 is disposed on the left side. A right end face of the printed circuit board 14 is disposed on a right side with respect to the printed circuit board 7, and a left end face of the printed circuit board 14 is disposed on a left side with respect to the printed circuit board 7. A right end face of the printed circuit board 15 is disposed on a right side with respect to the printed circuit board 8, and a left end face of the printed circuit board 15 is disposed on a left side with respect to the printed circuit board 8.

Each of the printed circuit boards 14 and 15 includes a breakage detection circuit pattern layer which is formed with a breakage detection circuit pattern formed to detect its own disconnection and its short-circuit. Further, an attaching part 14*a* to which an attaching detection mechanism 5 is attached is formed on a right end side of the printed circuit board 14 so as to protrude to the right side, and an attaching part 15*a* to which an attaching detection mechanism 5 is attached is formed on a left end side of the printed circuit board 15 so as to protrude to the left side. The attaching parts 14*a* and 15*a* are formed in a substantially square shape. The attaching part 14*a* is protruded to the right side with respect to the partition part 18 and the attaching part 15*a* is protruded to the left side with respect to the partition part 18.

A printed circuit board 16 is a flexible circuit board (flexible printed circuit board) which is formed in a film shape. The printed circuit board 16 is structured of a printed circuit board 16*a* stuck on an inner side face of the rear side face part of the second case body 22, a printed circuit board 16*b* stuck on the left side face part of the second case body 22, a printed circuit board 16*c* stuck on an inner side face of the upper side face part of the second case body 22, and a printed circuit board 16*d* stuck on an inner side face of the lower side face part of the second case body 22. In other words, the printed circuit board 16 is formed of the printed circuit boards 16*a* through 16*d* which are integrally formed with each other. The printed circuit board 16 is stuck on the whole of the inner side face of the second case body 22 along the inner side face of the second case body 22. Further, the printed circuit board 16 includes a breakage detection circuit pattern layer which is formed with a breakage detection circuit pattern formed to detect its own disconnection and its short-circuit.

The breakage detection circuit pattern which is formed in the printed circuit boards 7, 14 through 16 is, for example, structured so that two conductor patterns which are formed in a line shape are wound in a spiral shape from an outer peripheral side to an inner peripheral side of the printed circuit boards 7, 14 through 16. Further, the breakage detection circuit pattern is formed over the substantially entire surface of each of the printed circuit boards 7, 14 through 16. The breakage detection circuit pattern is connected with a detection circuit structured to detect disconnection of the breakage detection circuit pattern and short-circuit of the breakage detection circuit pattern. Further, the breakage detection circuit pattern is connected with a backup cell through the detection circuit and, when a power supply for the card reader 1 is set in an "OFF" state, electric power is supplied to the breakage detection circuit pattern from the backup cell.

In this embodiment, when disconnection or short-circuit of the breakage detection circuit pattern of each of the printed circuit boards 7, 14 through 16 is detected, a predetermined processing is executed, for example, data stored in the printed circuit boards 7 and 8 are erased, or the printed circuit boards 7 and 8 are set in an unusable state. In this embodiment, disconnection of the breakage detection circuit pattern and short-circuit of the breakage detection circuit pattern are detected on the basis of a detected result of the detection circuit. However, it may be structured that only one of disconnection of the breakage detection circuit pattern and short-circuit of the breakage detection circuit pattern is detected on the basis of a detected result of the detection circuit.

As described above, the printed circuit board 7 is fixed to the right side face of the card accommodation part 17 and the data signal circuit pattern layer of the printed circuit board 7 is disposed on the left side with respect to the breakage detection circuit pattern layer of the printed circuit board 7. Further, the printed circuit board 7 is covered by the second case body 22 from the rear side and from both sides in the upper and lower direction. The printed circuit board 8 is fixed to the left side face of the card accommodation part 17 and is covered by the second case body 22 from the left side, the rear side and both sides in the upper and lower direction. Further, the printed circuit board 16 having the breakage detection circuit pattern layer is stuck on the inner side face of the second case body 22. In addition, the printed circuit boards 14 and 15 having the breakage detection circuit pattern layer are disposed on a front side with respect to the printed circuit boards 7 and 8. Further, the right end face of the printed circuit board 14 is disposed on the right side with respect to the printed circuit board 7, the left end face of the printed circuit board 14 is disposed on the left side with respect to the printed circuit board 7, the right end face of the printed circuit board 15 is disposed on the right side with respect to the printed circuit board 8, and the left end face of the printed circuit board 15 is disposed on the left side with respect to the printed circuit board 8.

In other words, in this embodiment, the data signal circuit patterns of the printed circuit boards 7 and 8 are disposed within a protected region "D" that is a region surrounded by the breakage detection circuit patterns from all directions. Specifically, the data signal circuit patterns of the printed circuit boards 7 and 8 are disposed in the protected region "D" that is a region surrounded from all directions by the breakage detection circuit pattern formed in the printed circuit board 7, the breakage detection circuit pattern formed in the printed circuit board 16, and the breakage detection circuit patterns formed in the printed circuit boards 14 and 15. The protected region "D" is a space whose security is secured.

The printed circuit boards 14 and 15 in this embodiment are a first printed circuit board which is formed with a breakage detection circuit pattern and is disposed on a front face side of the card reader 1, the printed circuit board 16*a* is a second printed circuit board which is formed with a breakage detection circuit pattern and is disposed on a rear face side of the card reader 1, the printed circuit board 7 is a third printed circuit board which is formed with a breakage detection circuit pattern and is disposed on the right side that is one side in a thickness direction of a card 2, the printed circuit board 16*b* is a fourth printed circuit board which is formed with a breakage detection circuit pattern and is disposed on the left side that is the other side in the thickness direction of the card 2, the printed circuit board 16*c* is a fifth printed circuit board which is formed with a breakage detection circuit pattern and is disposed on the upper side that is one side in a width direction of the card 2, and the printed circuit board 16*d* is a sixth printed circuit board which is formed with a breakage detection circuit pattern and is disposed on the lower side that is the other side in the width direction of the card 2.

The card reader 1 in this embodiment includes a detection mechanism structured to detect at least one of states that the front cover 11 has been detached, the first case body 21 has been detached, and the second case body 22 has been detached. Further, in this embodiment, when at least one of states that the front cover 11 has been detached, the first case body 21 has been detached, and the second case body 22 has been detached is detected, a predetermined processing is executed, for example, data stored in the printed circuit boards 7 and 8 are erased, or the printed circuit boards 7 and 8 are set in an unusable state.

(Structure of Attaching Detection Mechanism)

Figure 5A:
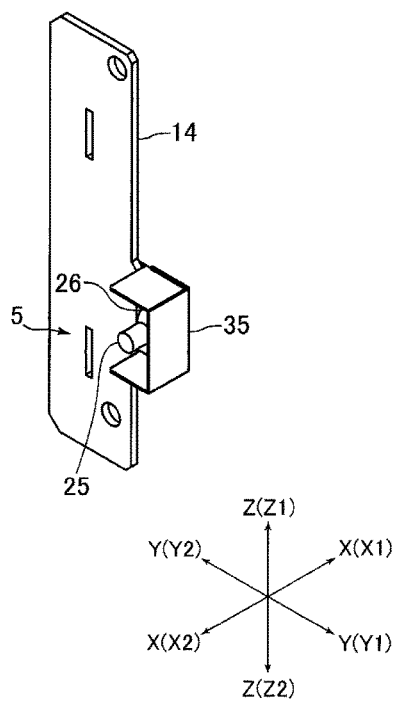
FIGS. 5(A) and 5(B) are perspective views for explaining a structure of an attaching detection mechanism shown in FIG. 4 and its surrounding portion.
Figure 5B:
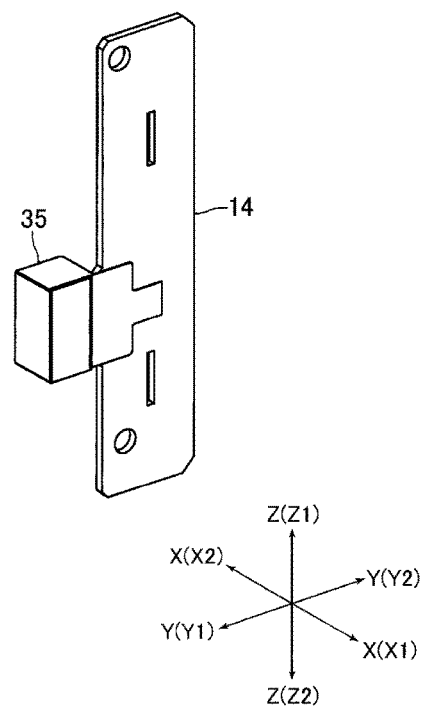
Figure 6A:
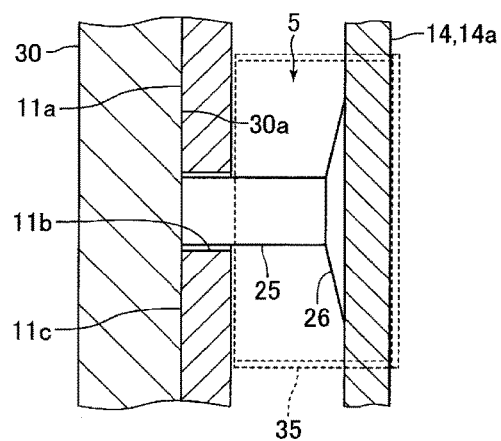
FIGS. 6(A) and 6(B) are enlarged cross-sectional views for explaining a structure of an attaching detection mechanism shown in FIG. 4 and its surrounding portion.
Figure 6B:
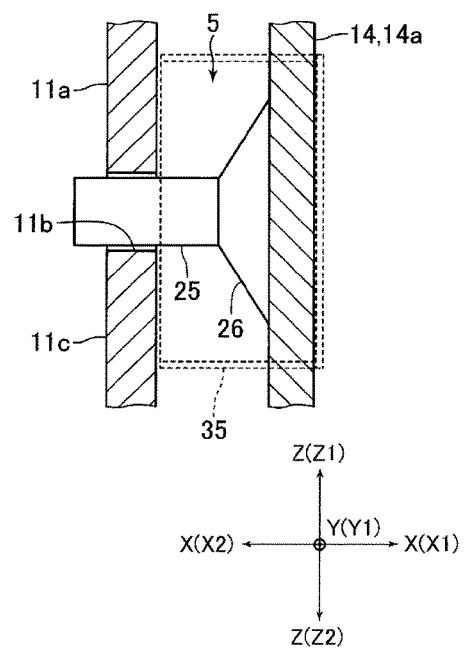

FIGS. 5(A) and 5(B) are perspective views for explaining a structure of an attaching detection mechanism 5 shown in FIG. 4 and its surrounding portion. FIGS. 6(A) and 6(B) are enlarged cross-sectional views for explaining a structure of an attaching detection mechanism 5 shown in FIG. 4 and its surrounding portion.

An attaching detection mechanism 5 includes a switch member 25 formed in a bar shape and a pressed member 26 which is disposed at a position to be pressed by the switch member 25. The attaching detection mechanism 5 is attached to the printed circuit boards 14 and 15. Specifically, the attaching detection mechanism 5 is attached to an attaching part 14a of the printed circuit board 14 and an attaching part 15a of the printed circuit board 15. In other words, in this embodiment, the attaching detection mechanism 5 is provided at two positions. Further, the attaching detection mechanism 5 which is attached to the printed circuit board 14 is disposed on the right side with respect to the card passage where a card 2 inserted into the insertion port 10 is passed, and the attaching detection mechanism 5 which is attached to the printed circuit board 15 is disposed on the left side with respect to the card passage. In other words, the switch member 25 and the pressed member 26 which are attached to the printed circuit board 14 are disposed on the right side with respect to the card passage, and the switch member 25 and the pressed member 26 which are attached to the printed circuit board 15 are disposed on the left side with respect to the card passage. Further, the attaching detection mechanism 5 (in other words, the switching member 25 and the pressed member 26) is attached to front faces of the printed circuit boards 14 and 15.

The switch member 25 is, for example, formed in a columnar shape. The switch member 25 is disposed so that an axial direction (longitudinal direction) of the switch member 25 and the front and rear direction are coincided with each other and is movable in the front and rear direction. Further, as shown in FIGS. 6(A) and 6(B), a tip end side portion of the switch member 25 is inserted into an insertion hole 11b formed in the flange part 11a of the front cover 11. The insertion hole 11b is formed so as to penetrate through the flange part 11a in the front and rear direction. When the card reader 1 is not attached to a host apparatus, as shown in FIG. 1 and the like, a tip end side portion of the switch member 25 is protruded to a front face side of the card reader 1. Specifically, when the card reader 1 is not attached to a host apparatus, the tip end side portion of the switch member 25 is protruded to a front side with respect to a front face 11c of the flange part 11a.

The pressed member 26 is mounted on the printed circuit boards 14 and 15. Further, the pressed member 26 is disposed at a position where a base end (rear end) of the switch member 25 is contacted. In other words, the pressed member 26 is disposed to a rear side of the switch member 25. The pressed member 26 is capable of being switched between a pressed state that the pressed member 26 is pressed with a predetermined force by the switch member 25 and a non-pressed state that the pressed state is released. The pressed member 26 is structured so that, for example, the pressed member 26 becomes an electrically conductive state when pressed with a predetermined force by the switch member 25 and, when the pressing force by the switch member 25 is weakened, the pressed member 26 becomes a non-conductive state. Therefore, the pressed member 26 becomes a pressed state in an electrically conductive state and becomes a non-pressed state in a non-conductive state. Alternatively, the pressed member 26 is provided with a pressure sensor and, when a detection value of the pressure sensor is not more than a predetermined threshold value, the pressed member 26 becomes a non-pressed state and, when the detection value of the pressure sensor exceeds the threshold value, the pressed member 26 becomes a pressed state.

In this embodiment, when the card reader 1 is attached to a host apparatus, as shown in FIG. 6(A), the front face 11c of the flange part 11a of the front cover 11 is abutted with a rear face 30a of the front panel 30 which structures a front face of the host apparatus. Therefore, when the card reader 1 is attached to the host apparatus, the tip end of the switch member 25 is contacted with the rear face 30a of the front panel 30 and the switch member 25 is moved to a side of the pressed member 26 (in other words, to the rear side) and thus the pressed member 26 is switched to the pressed state from the non-pressed state. In other words, the pressed member 26 is set to be the pressed state in a state that the card reader 1 has been attached to the host apparatus.

On the other hand, when the card reader 1 is detached from the host apparatus, as shown in FIG. 6(B), the switch member 25 is moved in a direction separated from the pressed member 26 (in other words, to the front direction) and the pressed member 26 is switched from the pressed state to a non-pressed state. Therefore, it can be detected that the card reader 1 has been detached from the host apparatus based on a detected result of the attaching detection mechanism 5 (specifically, a state of the pressed member 26). Further, when it is detected that the card reader 1 has been detached from the host apparatus, a predetermined processing is executed, for example, data stored in the printed circuit boards 7 and 8 are erased, or the printed circuit boards 7 and 8 are set in an unusable state. In this embodiment, the front face 11c of the flange part 11a is an abutting face which is abutted with the rear face 30a of the front panel 30, and the flange part 11a is an abutting member having the front face 11c which is the abutting face.

As shown in FIGS. 5(A) and 5(B), the switch member 25 is surrounded by a printed circuit board 35. The printed circuit board 35 is a flexible circuit board which is formed in a film shape. Further, the printed circuit board 35 includes a breakage detection circuit pattern layer which is formed with a breakage detection circuit pattern for detecting its own disconnection and its short-circuit. The breakage detection circuit pattern is, for example, structured so that two conductor patterns which are formed in a line shape are wound around in a spiral shape from an outer peripheral side to an inner peripheral side of the printed circuit board 35. Further, the breakage detection circuit pattern is formed over the substantially entire face of the printed circuit board 35. Further, the breakage detection circuit pattern is connected with a detection circuit structured to detect disconnection of the breakage detection circuit pattern and short-circuit of the breakage detection circuit pattern and is connected with a backup cell through the detection circuit and, when a power supply for the card reader 1 is set in an "OFF" state, electric power is supplied to the breakage detection circuit pattern from the backup cell.

In this embodiment, when disconnection or short-circuit of the breakage detection circuit pattern of the printed circuit board 35 is detected, a predetermined processing is executed, for example, data stored in the printed circuit boards 7 and 8 are erased, or the printed circuit boards 7 and 8 are set in an unusable state. In this embodiment, disconnection of the breakage detection circuit pattern and short-circuit of the breakage detection circuit pattern of the printed circuit board 35 are detected on the basis of a detected result of the detection circuit. However, it may be structured that only one of disconnection of the breakage detection circuit pattern and short-circuit of the breakage detection circuit pattern is detected on the basis of a detected result of the detection circuit. In FIGS. 3 and 4, the printed circuit board 35 is not shown.

The printed circuit board 35 is disposed on a rear side with respect to the flange part 11a and a rear side portion of the switch member 25 with respect to the flange part 11a is surrounded by the printed circuit board 35. Further, in this embodiment, the pressed member 26 is also surrounded by the printed circuit board 35. In other words, the entire attaching detection mechanism 5 is surrounded by the printed circuit board 35. Further, the switch member 25 and the pressed member 26 of the attaching detection mechanism 5 attached to the printed circuit board 14 are, as shown in FIGS. 5(A) and 5(B), surrounded by the printed circuit board 35 from four directions, i.e., from both of the upper and lower sides, the right side and the rear side. The switch member 25 and the pressed member 26 of the attaching detection mechanism 5 attached to the printed circuit board 15 are surrounded by the printed circuit board 35 from four directions, i.e., from both of the upper and lower sides, the left side and the rear side.

A portion of the printed circuit board 35 which surrounds the switch member 25 from the rear side is stuck on each of the rear faces of the attaching parts 14a and 15a. The attaching part 14a is surrounded by the printed circuit board 35 from four directions, i.e., from both of the upper and lower sides, the right side and the rear side, and the attaching part 15a is surrounded by the printed circuit board 35 from four directions, i.e., from both of the upper and lower sides, the left side and the rear side. The printed circuit boards 35 are electrically connected with the printed circuit boards 14 and 15. Further, the printed circuit board 35 is covered by a circuit board protection part 11d which is formed on both end sides in the right and left direction on the rear face side of the flange part 11a. Specifically, the printed circuit board 35 surrounding the switch member 25 of the attaching detection mechanism 5 which is attached to the printed circuit board 14 is covered by the circuit board protection part 11d from both of the upper and lower sides and the right side. Further, the printed circuit board 35 surrounding the switch member 25 of the attaching detection mechanism 5 which is attached to the printed circuit board 15 is covered by the circuit board protection part 11d from both of the upper and lower sides and the left side.

(Principal Effects in this Embodiment)

As described above, in this embodiment, the data signal circuit patterns of the printed circuit boards 7 and 8 are disposed within the protected region "D" surrounded from all directions by the breakage detection circuit patterns of the printed circuit boards 7 and 14 through 16. Therefore, according to this embodiment, in order to illegally acquire data from the card reader 1 in a state that the card reader 1 has been attached to a host apparatus, when a criminal performs some trick in the card reader 1, the breakage detection circuit patterns of the printed circuit boards 7, 14 through 16 are disconnected or short-circuited and thus it is detected that some trick is being applied to the card reader 1. Further, in this embodiment, when disconnection or short-circuit of the breakage detection circuit patterns of the printed circuit boards 7, 14 through 16 is detected, a predetermined processing is executed, for example, data stored in the printed circuit boards 7 and 8 are erased, or the printed circuit boards 7 and 8 are set in an unusable state. Therefore, according to this embodiment, even if a criminal tries to illegally acquire data from the card reader 1 without detaching the card reader 1 from the host apparatus, data can be prevented from being illegally acquired from the card reader 1.

In this embodiment, the printed circuit board 16 is formed of the printed circuit boards 16a through 16d which are integrally formed with each other. Therefore, according to this embodiment, in comparison with a case that the printed circuit boards 16a through 16d are separately formed from each other, the printed circuit boards 16a through 16d can be easily handled when the card reader 1 is to be assembled. Further, in this embodiment, the printed circuit board 16 is stuck on an inner side face of the second case body 22 and thus, even when the printed circuit board 16 is a flexible circuit board, the data signal circuit pattern can be surely surrounded by the breakage detection circuit pattern from the rear side, the left side and both of the upper and lower sides.

In this embodiment, a card 2 is passed between the printed circuit board 14 and the printed circuit board 15 in the right and left direction. Therefore, according to this embodiment, in comparison with a case that a passage opening where a card 2 is passed is formed in one piece of a printed circuit board, respective shapes of the printed circuit boards 14 and 15 can be simplified.

In this embodiment, the attaching detection mechanism 5 includes the switch member 25 formed in a bar shape and the pressed member 26 which is capable of being switched between a pressed state and a non-pressed state. Therefore, in this embodiment, a moving amount of the switch member 25 between a position of the switch member 25 when the card reader 1 has been attached to a host apparatus and a position of the switch member 25 when the card reader 1 is detached from the host apparatus can be increased. Accordingly, in this embodiment, even in a case that the card reader 1 is not attached to a host apparatus with a high degree of accuracy, when the card reader 1 is attached to the host apparatus, the pressed member 26 can be switched to a pressed state and, as a result, it can be detected with a high degree of accuracy that the card reader 1 has been attached to the host apparatus.

In this embodiment, the switch member 25 is surrounded by the printed circuit board 35 formed with the breakage detection circuit pattern. Therefore, in this embodiment, when a criminal is trying to apply some trick to the switch member 25 so that the switch member 25 is not moved in a case that the card reader 1 is detached from the host apparatus, the breakage detection circuit pattern of the printed circuit board 35 is disconnected or short-circuited. Accordingly, it is detected that some trick is going to be performed on the switch member 25. Further, in this embodiment, when disconnection or short-circuit of the breakage detection circuit pattern of the printed circuit board 35 is detected, a predetermined processing is executed, for example, data stored in the printed circuit boards 7 and 8 are erased, or the printed circuit boards 7 and 8 are set in an unusable state, and thus illegal acquisition of data from the card reader 1 can be prevented. Especially, in this embodiment, the pressed member 26 is also surrounded by the printed circuit board 35 and thus, also in a case that a criminal is trying to apply some trick to the pressed member 26, the breakage detection circuit pattern of the printed circuit board 35 is disconnected or short-circuited. Therefore, illegal acquisition of data from the card reader 1 can be effectively prevented.

In this embodiment, the switch member 25 and the pressed member 26 which are attached to the printed circuit board 14 are disposed on the right side with respect to the card passage, and the switch member 25 and the pressed member 26 which are attached to the printed circuit board 15 are disposed on the left side with respect to the card passage. Further, in this embodiment, the switch member 25 and the pressed member 26 which are disposed on the right side with respect to the card passage are surrounded by the printed circuit board 35 in four directions, in other words, from both of the upper and lower sides, the right side and the rear side. Further, the switch member 25 and the pressed member 26 which are disposed on the left side with respect to the card passage are surrounded by the printed circuit board 35 in four directions, in other words, from both of the upper and lower sides, the left side and the rear side. It is difficult to perform some trick from the left side on the switch member 25 and the pressed member 26 which are disposed on the right side with respect to the card passage, and it is difficult to perform some trick from the right side on the switch member 25 and the pressed member 26 which are disposed on the left side with respect to the card passage. Therefore, according to this embodiment, a region where the switch member 25 and the pressed member 26 are surrounded by the printed circuit board 35 for preventing some trick from being performed on the switch member 25 and the pressed member 26 can be limited to a necessary minimum region. Accordingly, in this embodiment, the size of the card reader 1 can be reduced.

In this embodiment, the attaching detection mechanism 5 is attached to the printed circuit boards 14 and 15 which form the protected region "D". Therefore, according to this embodiment, in comparison with a case that a printed circuit board for attaching the attaching detection mechanism 5 is separately provided in addition to the printed circuit boards 14 and 15, the structure of the card reader 1 can be simplified.

In this embodiment, the printed circuit board 35 is a flexible circuit board. Therefore, according to this embodiment, the printed circuit board 35 can be flexibly disposed depending on a surrounding situation of the switch member 25 and the pressed member 26. Accordingly, in this embodiment, an arrangement of the printed circuit board 35 surrounding the switch member 25 and the pressed member 26 is relatively easy.

Other Embodiments

Although the present invention has been shown and described with reference to a specific embodiment, various changes and modifications will be apparent to those skilled in the art from the teachings herein.

In the embodiment described above, the breakage detection circuit pattern is formed in the printed circuit board 7. However, no breakage detection circuit pattern may be formed in the printed circuit board 7. In this case, for example, a film-shaped printed circuit board (flexible circuit board) formed with the breakage detection circuit pattern is stuck along an inner side face of the first case body 21 and on the entire inner side face of the first case body 21. Also in this case, the data signal circuit patterns of the printed circuit boards 7 and 8 are disposed within the protected region "D" that is a region surrounded by the breakage detection circuit patterns in all directions. Further, in this case, the printed circuit board is the third printed circuit board.

In the embodiment described above, the printed circuit boards 14 and 15 are rigid circuit boards. However, the printed circuit boards 14 and 15 may be flexible circuit boards which are formed in a film shape. In this case, the flexible circuit boards are the first printed circuit board. Further, in the embodiment described above, two printed circuit boards 14 and 15 are disposed on a front face side of the card reader 1. However, instead of two printed circuit boards 14 and 15, one piece of a printed circuit board may be disposed on a front face side of the card reader 1. Further, in the embodiment described above, the printed circuit board 35 is a flexible circuit board. However, the printed circuit board 35 may be a rigid circuit board which is formed in a plate shape.

In the embodiment described above, the printed circuit board 16 is structured of the printed circuit boards 16a through 16d which are integrally formed with each other. However, the present invention is not limited to this embodiment. For example, at least one of the printed circuit boards 16a through 16d may be formed separately. Further, in a case that at least one of the printed circuit boards 16a through 16d is formed separately, a rigid circuit board formed in a plate shape may be included in the printed circuit boards 16a through 16d. Further, in a case that all of the printed circuit boards 16a through 16d are formed separately from each other, all of the printed circuit boards 16a through 16d may be rigid circuit boards formed in a plate shape.

In the embodiment described above, no breakage detection circuit pattern is formed in the printed circuit board 8. However, a breakage detection circuit pattern may be formed in the printed circuit board 8. In this case, the data signal circuit pattern layer of the printed circuit board 8 is disposed on the right side with respect to the breakage detection circuit pattern layer of the printed circuit board 8. Further, in this case, the printed circuit board 16b is not required to be provided. Also in this case, the data signal circuit patterns of the printed circuit boards 7 and 8 are disposed within the protected region "D" that is a region surrounded by the breakage detection circuit patterns in all directions. Further, the printed circuit board 8 in this case is the fourth printed circuit board.

In the embodiment described above, the attaching detection mechanism 5 is attached to the printed circuit boards 14 and 15. However, the present invention is not limited to this embodiment. For example, in addition to the printed circuit boards 14 and 15, a circuit board to which the attaching detection mechanism 5 is attached may be provided. Further, in the embodiment described above, the attaching detection mechanism 5 is disposed on both right and left sides with respect to the card passage. However, the attaching detection mechanism 5 may be disposed only on one side in the right and left direction with respect to the card passage. Further, the attaching detection mechanism 5 may be disposed only on both sides in the upper and lower direction with respect to the card passage, or only on one side in the upper and lower direction with respect to the card passage.

In the embodiment described above, the switch member 25 and the pressed member 26 of the attaching detection mechanism 5 which are attached to the printed circuit board 14 are surrounded by the printed circuit board 35 in four directions, in other words, from both upper and lower sides, the right side and the rear side. However, the present invention is not limited to this embodiment. For example, the switch member 25 and the pressed member 26 may be surrounded by the printed circuit board 35 in three directions, in other words, from both upper and lower sides and the right side, may be surrounded by the printed circuit board 35 in five directions, in other words, from both upper and lower sides, both right and left sides and the rear side, or may be surrounded by the printed circuit board 35 in four directions, in other words, from both upper and lower sides and both right and left sides. Similarly, in the embodiment described above, the switch member 25 and the pressed member 26 of the attaching detection mechanism 5 which are attached to the printed circuit board 15 are surrounded by the printed circuit board 35 in four directions, in other words, from both upper and lower sides, the left side and the rear side. However, the switch member 25 and the pressed member 26 may be surrounded by the printed circuit board 35 in three directions, in other words, from both upper and lower sides and the left side, may be surrounded by the printed circuit board 35 in five directions, in other words, from both upper and lower sides, both right and left sides and the rear side, or may be surrounded by the printed circuit board 35 in four directions, in other words, from both upper and lower sides and both right and left sides.

Further, in the embodiment described above, the switch member 25 and the pressed member 26 are surrounded by the printed circuit board 35. However, only one of the switch member 25 and the pressed member 26 may be surrounded by the printed circuit board 35. Further, the switch member 25 and the pressed member 26 are not required to be surrounded by the printed circuit board. Further, in the embodiment described above, the attaching detection mechanism 5 includes the switch member 25 and the pressed member 26. However, the attaching detection mechanism 5 may be a sheet switch described in the above-mentioned Patent Literature 1. Further, the card reader 1 may include no attaching detection mechanism 5.

In the embodiment described above, the front cover 11 is formed of resin material. However, the front cover 11 may be formed of metal material such as aluminum alloy. Further, in the embodiment described above, the card reader 1 is a manual type card reader. However, the card reader 1 may be a card conveyance type card reader including a card conveying mechanism structured to automatically convey a card 2.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

The invention claimed is:

1. A card reader comprising:
    a data signal pattern formed to transmit at least one of a data signal read from a card and a data signal to be recorded to the card;
    a breakage detection pattern formed to detect at least one of its own disconnection and its own short-circuit;
    a first printed circuit board in a plate shape or a film shape which is formed with the breakage detection pattern and is disposed on a front face side of the card reader;
    a second printed circuit board in a plate shape or a film shape which is formed with the breakage detection pattern and is disposed on a rear face side of the card reader;
    a third printed circuit board in a plate shape or a film shape which is formed with the breakage detection pattern and is disposed on one side in a thickness direction of the card inserted into the card reader;
    a fourth printed circuit board in a plate shape or a film shape which is formed with the breakage detection pattern and is disposed on the other side in the thickness direction of the card;
    a fifth printed circuit board in a plate shape or a film shape which is formed with the breakage detection pattern and is disposed on one side in a width direction of the card which is perpendicular to a front and rear direction of the card reader and the thickness direction of the card; and
    a sixth printed circuit board in a plate shape or a film shape which is formed with the breakage detection pattern and is disposed on the other side in the width direction of the card;
    wherein the data signal pattern is disposed within a protected region that is a region surrounded from all directions by the breakage detection pattern;
    wherein a region which is surrounded by the breakage detection pattern formed in the first printed circuit board, the breakage detection pattern formed in the second printed circuit board, the breakage detection pattern formed in the third printed circuit board, the breakage detection pattern formed in the fourth printed circuit board, the breakage detection pattern formed in the fifth printed circuit board, and the breakage detection pattern formed in the sixth printed circuit board is the protected region;
    the first printed circuit board is structured of two pieces of the first printed circuit board which are disposed in a separated state with a predetermined distance therebetween in the thickness direction of the card, and
    the card is passed between the two pieces of the first printed circuit board in the thickness direction of the card.

2. The card reader according to claim 1, wherein
    the first printed circuit board and the third printed circuit board are rigid circuit boards formed in a plate shape,
    the second printed circuit board, the fourth printed circuit board, the fifth printed circuit board and the sixth printed circuit board are flexible circuit boards which are formed in a film shape, and
    the second printed circuit board, the fourth printed circuit board, the fifth printed circuit board and the sixth printed circuit board are integrally formed with each other and are stuck on an inner side face of a case body which structures a part of a housing of the card reader.

3. The card reader according to claim 1, wherein
    the first printed circuit board is attached with an attaching detection mechanism structured to detect that the card reader has been attached to a host apparatus,
    the attaching detection mechanism comprises a switch member formed in a bar shape and a pressed member which is mounted on the first printed circuit board and is capable of being switched between a pressed state that the pressed member is pressed by the switch member with a predetermined force and a non-pressed state that the pressed state is released,
    when the card reader is attached to the host apparatus, the switch member is moved to a side of the pressed member and the pressed member is switched to the pressed state from the non-pressed state, and when the card reader is detached from the host apparatus, the switch member is moved in a direction separated from the pressed member and the pressed member is switched to the non-pressed state from the pressed state.

4. The card reader according to claim 3, wherein the switch member is surrounded by a printed circuit board in a plate shape or a film shape which is formed with a breakage detection pattern formed to detect at least one of its own disconnection and its own short-circuit.

5. A card reader which is attached to and used in a host apparatus, the card reader comprising:
- an attaching detection mechanism structured to detect that the card reader has been attached to the host apparatus;
- wherein the attaching detection mechanism comprises:
  - a switch member which is formed in a bar shape; and
  - a pressed member which is capable of being switched between a pressed state that the pressed member is pressed by the switch member with a predetermined force and a non-pressed state that the pressed state is released;
- wherein when the card reader is attached to the host apparatus, the switch member is moved to a side of the pressed member and the pressed member is switched to the pressed state from the non-pressed state;
- wherein when the card reader is detached from the host apparatus, the switch member is moved in a direction separated from the pressed member and the pressed member is switched to the non-pressed state from the pressed state; and
- wherein the switch member is surrounded by a printed circuit board in a plate shape or a film shape which is formed with a breakage detection pattern formed to detect at least one of its own disconnection and its own short-circuit.

6. The card reader according to claim 5, further comprising an abutting member having an abutting face which is to be abutted with a rear face of a front panel structuring a front face of the host apparatus,
- wherein the abutting member is formed with an insertion hole so as to be penetrated through the abutting member, a tip end side portion of the switch member being inserted into the insertion hole,
- wherein when the card reader is not attached to the host apparatus, the tip end side portion of the switch member is protruded to a front face side of the card reader with respect to the abutting face, and
- wherein a rear side portion of the switch member with respect to the abutting member is surrounded by the printed circuit board.

7. The card reader according to claim 6, wherein the printed circuit board also surrounds the pressed member.

8. The card reader according to claim 6, further comprising a first printed circuit board in a plate shape or a film shape which is formed with a breakage detection pattern formed to detect at least one of its own disconnection and its own short-circuit, the first printed circuit board being disposed on a front face side of the card reader,
- wherein the attaching detection mechanism is attached to the first printed circuit board.

9. The card reader according to claim 6, wherein the switch member is disposed on one side in a thickness direction of a card with respect to a card passage where the card inserted into the card reader is passed, and when a direction perpendicular to a front and rear direction of the card reader and a thickness direction of the card is referred to as a width direction of the card, the printed circuit board surrounds the switch member from four directions, in other words, from both sides in the width direction of the card, from one side in the thickness direction of the card, and from a rear face side of the card reader.

10. The card reader according to claim 9, wherein the printed circuit board also surrounds the pressed member.

11. The card reader according to claim 9, further comprising a first printed circuit board in a plate shape or a film shape which is formed with a breakage detection pattern formed to detect at least one of its own disconnection and its own short-circuit, the first printed circuit board being disposed on a front face side of the card reader,
- wherein the attaching detection mechanism is attached to the first printed circuit board.

12. The card reader according to claim 10, further comprising a first printed circuit board in a plate shape or a film shape which is formed with a breakage detection pattern formed to detect at least one of its own disconnection and its own short-circuit, the first printed circuit board being disposed on a front face side of the card reader,
- wherein the attaching detection mechanism is attached to the first printed circuit board.

13. The card reader according to claim 5, wherein the printed circuit board also surrounds the pressed member.

14. The card reader according to claim 5, further comprising a first printed circuit board in a plate shape or a film shape which is formed with a breakage detection pattern formed to detect at least one of its own disconnection and its own short-circuit, the first printed circuit board being disposed on a front face side of the card reader, wherein the attaching detection mechanism is attached to the first printed circuit board.

15. The card reader according to claim 5, wherein the printed circuit board is a flexible circuit board formed in a film shape.

16. A card reader comprising:
- a data signal pattern formed to transmit at least one of a data signal read from a card and a data signal to be recorded to the card;
- a breakage detection pattern formed to detect at least one of its own disconnection and its own short-circuit;
- a first printed circuit board in a plate shape or a film shape which is formed with the breakage detection pattern and is disposed on a front face side of the card reader;
- a second printed circuit board in a plate shape or a film shape which is formed with the breakage detection pattern and is disposed on a rear face side of the card reader;
- a third printed circuit board in a plate shape or a film shape which is formed with the breakage detection pattern and is disposed on one side in a thickness direction of the card inserted into the card reader;
- a fourth printed circuit board in a plate shape or a film shape which is formed with the breakage detection pattern and is disposed on the other side in the thickness direction of the card;
- a fifth printed circuit board in a plate shape or a film shape which is formed with the breakage detection pattern and is disposed on one side in a width direction of the card which is perpendicular to a front and rear direction of the card reader and the thickness direction of the card; and a sixth printed circuit board in a plate shape or a film shape which is formed with the breakage detection pattern and is disposed on the other side in the width direction of the card;

wherein the data signal pattern is disposed within a protected region that is a region surrounded from all directions by the breakage detection pattern;

wherein a region which is surrounded by the breakage detection pattern formed in the first printed circuit board, the breakage detection pattern formed in the second printed circuit board, the breakage detection pattern formed in the third printed circuit board, the breakage detection pattern formed in the fourth printed circuit board, the breakage detection pattern formed in the fifth printed circuit board, and the breakage detection pattern formed in the sixth printed circuit board is the protected region;

the first printed circuit board is attached with an attaching detection mechanism structured to detect that the card reader has been attached to a host apparatus, the attaching detection mechanism comprises a switch member formed in a bar shape and a pressed member which is mounted on the first printed circuit board and is capable of being switched between a pressed state that the pressed member is pressed by the switch member with a predetermined force and a non-pressed state that the pressed state is released, when the card reader is attached to the host apparatus, the switch member is moved to a side of the pressed member and the pressed member is switched to the pressed state from the non-pressed state, and when the card reader is detached from the host apparatus, the switch member is moved in a direction separated from the pressed member and the pressed member is switched to the non-pressed state from the pressed state.

17. The card reader according to claim 16, wherein
the first printed circuit board and the third printed circuit board are rigid circuit boards formed in a plate shape,
the second printed circuit board, the fourth printed circuit board, the fifth printed circuit board and the sixth printed circuit board are flexible circuit boards which are formed in a film shape, and the second printed circuit board, the fourth printed circuit board, the fifth printed circuit board and the sixth printed circuit board are integrally formed with each other and are stuck on an inner side face of a case body which structures a part of a housing of the card reader.

18. The card reader according to claim 16, wherein the switch member is surrounded by a printed circuit board in a plate shape or a film shape which is formed with a breakage detection pattern formed to detect at least one of its own disconnection and its own short-circuit.

* * * * *